(12) United States Patent
Khalid et al.

(10) Patent No.: US 11,128,739 B2
(45) Date of Patent: Sep. 21, 2021

(54) NETWORK-EDGE-DEPLOYED TRANSCODING METHODS AND SYSTEMS FOR JUST-IN-TIME TRANSCODING OF MEDIA DATA

(71) Applicant: Verizon Patent and Licensing Inc., Arlington, VA (US)

(72) Inventors: Mohammad Raheel Khalid, Budd Lake, NJ (US); Samuel Charles Mindlin, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 16/231,935

(22) Filed: Dec. 24, 2018

(65) Prior Publication Data

US 2020/0204655 A1 Jun. 25, 2020

(51) Int. Cl.
*H04L 29/06* (2006.01)
(52) U.S. Cl.
CPC .............. *H04L 69/08* (2013.01); *H04L 69/18* (2013.01)
(58) Field of Classification Search
CPC ....... H04L 69/08; H04L 69/18; H04L 65/601; H04L 65/4069; H04L 63/00; H04L 67/306; H04L 65/80; H04L 65/605; H04L 65/607; H04L 65/4084; H04L 69/04; H04L 69/22; H04L 63/0457; H04L 67/18; H04L 67/322; H04L 67/2828; H04L 12/66; H04L 49/602; H04L 41/50; H04L 41/0226; H04L 9/065; H04L 43/08; H04L 4724/805;

(Continued)

(56) References Cited

U.S. PATENT DOCUMENTS 6,697,352 B1 * 2/2004 Ludwig ................... H04L 29/06
370/349
7,954,131 B2 * 5/2011 Cholas .................. H04L 69/326
725/112

(Continued)

OTHER PUBLICATIONS

Beck MT, Feld S, Fichtner A, Linnhoff-Popien C, Schimper T. ME-VoLTE: Network functions for energy-efficient video transcoding at the mobile edge. In2015 18th International Conference on Intelligence in Next Generation Networks Feb. 17, 2015 (pp. 38-44). IEEE. (Year: 2015).*

(Continued)

*Primary Examiner* — James N Fiorillo

(57) ABSTRACT

An exemplary network-edge-deployed transcoding system ("transcoding system") establishes a communication connection with a media player device that is distinct from the transcoding system. The transcoding system accesses media data representative of media content that is to be rendered by the media player device and is encoded in the media data using a first data format. As the media player device renders the media content, the transcoding system transcodes the media data in a just-in-time transcoding manner from representing the media content in the first data format to representing the media content in a second data format. As the transcoding of the media data is performed, the transcoding system provides the transcoded media data representing the media content in the second data format to the media player device by way of the communication connection. Corresponding methods and systems are also disclosed.

20 Claims, 8 Drawing Sheets

(58) Field of Classification Search
CPC ............... H04N 21/04; H04N 21/4408; H04N 21/6405; H04N 21/41407; H04N 21/25825; H04N 21/25833; H04N 21/25858; H04N 21/234309; H04N 7/173; H04N 21/238; H04N 21/258; H04N 21/438; H04N 21/472; H04N 21/2343; H04N 21/2402; H04N 21/2662; H04N 21/4621; H04N 21/44209; H04N 21/64792

USPC .......................................................... 709/246

See application file for complete search history.

(56) References Cited

U.S. PATENT DOCUMENTS

| | | | | |
|---|---|---|---|---|
| 8,117,322 | B1* | 2/2012 | McQuade | H04L 69/164 709/228 |
| 8,312,079 | B2* | 11/2012 | Newsome | G06F 16/9577 709/203 |
| 8,429,299 | B2* | 4/2013 | Chan | H04N 19/44 709/246 |
| 9,860,612 | B2* | 1/2018 | Good | H04N 21/8456 |
| 2002/0080771 | A1* | 6/2002 | Krumel | H04L 41/0803 370/352 |
| 2007/0140159 | A1* | 6/2007 | Eronen | H04L 69/165 370/328 |
| 2010/0088733 | A1* | 4/2010 | Chan | H04N 21/43632 725/80 |
| 2010/0195977 | A1* | 8/2010 | Bennett | H04N 21/4307 386/201 |
| 2011/0015985 | A1* | 1/2011 | Curtis | G06Q 30/0237 705/14.37 |
| 2011/0055864 | A1* | 3/2011 | Shah | H04N 21/4227 725/31 |
| 2011/0072073 | A1* | 3/2011 | Curtis | H04L 67/1002 709/203 |
| 2011/0083157 | A1* | 4/2011 | Addair | H04N 21/4126 725/120 |
| 2011/0264676 | A1* | 10/2011 | Belan | G06F 16/743 707/756 |
| 2012/0030376 | A1* | 2/2012 | Lemus | H04L 67/2823 709/246 |
| 2014/0082067 | A1* | 3/2014 | Byers | H04L 67/02 709/204 |
| 2014/0109144 | A1* | 4/2014 | Asnis | H04N 21/4227 725/48 |
| 2014/0282766 | A1* | 9/2014 | Good | H04N 21/2343 725/93 |
| 2015/0088890 | A1* | 3/2015 | Hoffert | G06F 16/24553 707/737 |
| 2015/0371426 | A1* | 12/2015 | Levy | G06T 13/80 345/473 |
| 2016/0205164 | A1* | 7/2016 | Schmidt | H04N 21/8456 709/219 |
| 2016/0337426 | A1* | 11/2016 | Shribman | H04L 65/608 |
| 2017/0017665 | A1* | 1/2017 | Savenok | G06Q 30/0643 |
| 2017/0171610 | A1* | 6/2017 | Nair | H04N 21/23476 |
| 2019/0173934 | A1* | 6/2019 | Beattie, Jr. | H04N 7/147 |
| 2019/0253742 | A1* | 8/2019 | Garten | H04N 21/2343 |
| 2020/0014988 | A1* | 1/2020 | Navali | H04N 21/234309 |
| 2020/0045245 | A1* | 2/2020 | Van Os | H04N 7/147 |

OTHER PUBLICATIONS

Beck MT, Feld S, Fichtner A, Linnhoff-Popien C, Schimper T. ME-VoLTE: Network functions for energy-efficient video transcoding at the mobile edge. In2015 18th International Conference on Intelligence in Next Generation Networks Feb. 17, 2015 (pp. 38-44). IEEE. (Year: 2016) (Year: 2015).*

Rusert T, Andersson K, Yu R, Nordgren H. Guided just-in-time transcoding for cloud-based video platforms. In2016 IEEE International Conference on Image Processing (ICIP) Sep. 25, 2016 (pp. 1489-1493). IEEE. (Year: 2016).*

* cited by examiner

NETWORK-EDGE-DEPLOYED TRANSCODING METHODS AND SYSTEMS FOR JUST-IN-TIME TRANSCODING OF MEDIA DATA

BACKGROUND INFORMATION

Media player devices are used to receive and render (e.g., present, play back, etc.) various types of media content that may be requested and consumed by users of the media player devices. For example, media player devices may be configured to receive and render audio data such as music or voice calls; video data such as web videos, television shows, movies, or video calls; extended reality data such as virtual reality data, augmented reality data, or gaming data; and so forth.

Typically, when media data is transferred to a media player device over a network, the media data is encoded in a particular encoded data format (rather than a raw data format) to facilitate transmission, storage, compression, encryption, conversion, and/or other types of processing that the media data may undergo. Encoding of media data may thus result in various benefits such as efficiency of a network used to transfer the media data, integrity of the media data as it is transmitted and received, security of the media data (e.g., so that the data may only be viewed by an intended user device), and so forth. However, before being rendered and used by a media player device, encoded media data typically must be decrypted and/or transcoded into a usable format (e.g., decoded into a raw data format) using an appropriate codec. Accordingly, media player devices conventionally include robust sets of codecs to enable the media player devices to transcode between various encoded and raw data formats.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
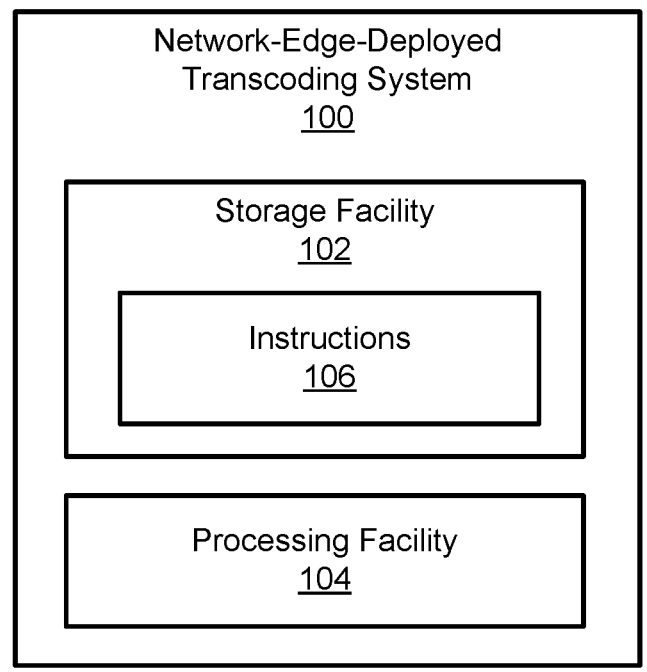
FIG. 1 illustrates an exemplary network-edge-deployed transcoding system for just-in-time transcoding of media data according to principles described herein.

Network-edge-deployed transcoding methods and systems for just-in-time transcoding of media data are described herein. For example, an exemplary network-edge-deployed transcoding system may establish a communication connection with a media player device that is distinct from the network-edge-deployed transcoding system. Additionally, the exemplary network-edge-deployed transcoding system may access media data. For example, the media data may be representative of media content that is to be rendered by the media player device and is encoded in the media data using a first data format. As the media player device renders the media content, the network-edge-deployed transcoding system may transcode the media data from representing the media content in the first data format (e.g., an encoded data format) to representing the media content in a second data format (e.g., a different encoded data format, a raw data format, etc.). Specifically, the network-edge-deployed transcoding system may transcode the media data in a "just-in-time transcoding" manner in which the transcoding occurs at render time (e.g., immediately prior to when the media content represented by the transcoded data is rendered by the media player device, such as a few milliseconds prior to rendering). As the just-in-time transcoding of the media data is performed, the network-edge-deployed transcoding system may provide the transcoded media data (which now represents the media content in the second data format rather than the first data format) to the media player device by way of the communication connection.

By performing just-in-time transcoding of media data in these ways (and/or in other suitable ways described herein), network-edge-deployed transcoding methods and systems described herein may leverage modern communication technologies such as Multi-access Edge Computing or Mobile Edge Computing ("MEC") technologies, 5G data networking technologies, and so forth, to perform transcoding tasks for media data being received by a media player device right as the media data is being received and/or rendered. Accordingly, network-edge-deployed transcoding systems configured to perform such just-in-time transcoding on a system that is distinct from a device rendering the media content (e.g., on a network-edge-deployed server distinct from a media player device) may serve as a complete substitute for on-device codecs that would typically perform transcoding operations in conventional configurations.

Substituting, replacing, or augmenting on-device codecs of media player devices that receive and render media content with off-device, network-edge codecs deployed on systems distinct from the media player devices may provide various advantages and benefits. For example, by offloading certain transcoding tasks (e.g., decoding particular encoded data formats) to network-edge codecs configured to provide just-in-time transcoding with negligible latency similar to that of conventional on-device codecs, media player devices may be manufactured and configured to not even include on-device codecs that would otherwise be included on the media player devices (e.g., on-device codecs supporting the particular encoded data formats handled by the off-device codecs). Minimizing software (e.g., licensed software) and/or hardware for media player devices that rely on just-in-time transcoding deployed on network-edge servers may provide significant cost savings, lead to manufacturing efficiencies, help meet processing requirements, and so forth. As such, device manufacturers, network service providers and carriers, users of devices and network data services, may benefit by the elimination of proprietary codecs on media player devices for local, on-device transcoding of media data.

Moreover, transcoding capabilities built into network-edge-deployed transcoding systems may be more feasible and/or economical to scale than transcoding capabilities built into media player devices. For example, while it may be prohibitively expensive (in terms of per unit costs as well as in terms of battery consumption, circuitry real estate, heat dissipation budgets, etc.) to include a large number of parallel processing resources and codecs on every individual media player device, such considerations may not be so limiting for a network-edge-deployed transcoding system that is configured to serve many media player devices. Accordingly, network-edge-deployed transcoding systems described herein may advantageously be configured to provide significant processing and transcoding resources in servers and other such form factors where considerations like battery life, circuitry real estate, and heat dissipation are of less concern (or at least may be addressed with more flexibility) than in media player device designs. Using such network-edge-deployed transcoding systems, new applications that require more real-time processing than can typically be handled by the processing resources of media player devices (e.g., including certain applications that will be described herein) may be enabled by off-device just-in-time transcoding technologies described herein.

In some examples, network-edge-deployed transcoding systems may be configured to provide the benefits described above by transcoding media data from a first encoded data format (e.g., a proprietary encoded data format) to a second encoded data format (e.g., an open encoded data format) that is supported by or is more accessible to the media player device. Additionally or alternatively, certain network-edge-deployed transcoding systems described herein may be configured to transcode media data from an encoded data format to a raw data format (i.e., to decode the media data), and to provide the raw media data to the media player device. In this way, the processing load of the media player device may be reduced since the media player device may receive media data that is ready for rendering and does not need to be decoded. Consequently, better codec performance (e.g., off-device transcoding that is faster, higher quality, etc.) and device resource conservation (e.g., saving battery life, processing resources, etc.) may result in an improved user experience for a user using the media player device.

As another advantage provided by the methods and systems described herein, a relatively large number of data formats may be economically supported for media player devices due to consolidation of the costs of transcoding such data formats to a network-edge-deployed transcoding system. For example, the network-edge-deployed transcoding systems described herein may be configured to maintain a few shared licenses for relatively obscure or expensive data formats that may not be desirable or justifiable from a cost perspective to include on each and every media player device.

In some examples, media player devices may be agnostic to the original data formats of media data requested by and/or transmitted to the media player devices because the media player devices may only actually receive data represented using data formats that the media player devices support (e.g., raw data formats, open encoded data formats that do not require costly proprietary licenses, etc.). For instance, as will be described in more detail below, media data represented in data formats that are incompatible with a particular media player device may be transcoded at a network-edge-deployed transcoding system before even being sent to the media player device in certain examples.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary network-edge-deployed transcoding system 100 ("system 100") for just-in-time transcoding of media data. Specifically, as shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data received, generated, managed, used, and/or transmitted by processing facility 104 in a particular implementation.

Processing facility 104 may be configured to perform (e.g., execute instructions 106 stored in storage facility 102 to perform) various functions associated with just-in-time transcoding of media data. For example, processing facility 104 may be configured to establish a communication connection with a media player device that is distinct from system 100. In some examples, the communication connection with the media player device may be an ultra-low latency communication connection. As used herein, an ultra-low latency communication connection may refer to a network connection or other communicative coupling between computing devices that allows data to travel between the devices in less time than users are readily capable of perceiving. For example, ultra-low latency communication connections may provide round trip processing and transmission delays of a few milliseconds (e.g., less than about 10-50 milliseconds in certain examples). Such ultra-low latency communication connections may be established by way of MEC technologies employed on 5G cellular data networks, or by way of other suitable technologies.

In some examples, system 100 may be integrated with (e.g., included as a part of) a carrier network such as a mobile telephone network, a cellular data network, or the like. As such, in certain examples, system 100 may be configured to serve a plurality of media player devices associated with different users who are subscribers to a network service associated with the carrier network. In these examples, processing facility 104 may establish ultra-low latency communication connections not only with the media player device mentioned above, but also with one or more other media player devices associated with one or more other users or subscribers.

The media player device may be configured to render media content represented in media data that the media player device receives. Accordingly, processing facility 104 may access the media data representative of the media content that is to be rendered by the media player device. The media data may be accessed from any suitable source at any point in a dataflow. For instance, as will be described in more detail below, processing facility 104 may access the media data, in certain examples, while the media data is traveling over the network en route to the media player device and before the media data reaches the media player device. In other examples, the media data may be received or stored by the media player device prior to the accessing by processing facility 104, such that processing facility 104 accesses the media data from the media player device itself.

Regardless of the source of the accessed media data, the media content represented within the media data may be encoded in the media data using a first data format, and processing facility 104 may be configured to transcode the media data from representing the media content in the first data format to representing the media content in a second data format.

As used herein, different data formats may be used to represent the media content in different ways and for different situations. For example, a "raw" data format may refer to a data format that is renderable by a media player device without further data conversion. More specifically, media data represented in a raw data format may be presented to a user without first being decompressed, decrypted, or otherwise modified. A pulse-code modulated ("PCM") data format may serve as one example of a raw data format used for audio media data.

Other types of data formats may be referred to herein as "encoded" data formats. Encoded data formats may be used for transferring, storing, or otherwise manipulating data, and may provide various benefits described herein. For example, an encoded data format may involve compressing a large amount of media data into a smaller amount of media data that is easier to transfer or store. However, as mentioned above, media data represented using an encoded data format may need to be decoded (i.e., transcoded into a raw data format) prior to being rendered.

As used herein, media data may be said to be "transcoded" when the media data is converted from one data format to another data format. For example, a codec may transcode media data from an encoded data format to a raw data format by way of a transcoding operation referred to herein as "decoding" the media data. As another example, a codec may transcode media data from a raw data format to an encoded data format by way of a transcoding operation referred to herein as "encoding" the media data. In certain examples, a codec may also transcode media data from one encoded data format to a different encoded data format. Such a transcoding operation may be performed directly or, as will be described in more detail below, by performing decoding and reencoding sub-operations.

The first data format in which the media data accessed by processing facility 104 is represented may be a data format that is unsupported by the media player device (e.g., for which the media player device lacks an active codec) or that is otherwise not acceptable or desirable for the media player device to receive. In some examples, this first data format may be a proprietary encoded data format. As used herein, a proprietary encoded data format may refer to an encoded data format that requires commercial hardware and/or software to transcode or decode. For example, a proprietary encoded data format may be transcoded using software that operates only under a commercial (paid) license, rather than, for example, an open (free) license.

As the media player device renders the media content (e.g., as the media data is streaming from system 100 to the media player device as described below), processing facility 104 may facilitate the rendering by transcoding the media data from representing the media content in the first data format to representing the media content in a second data format. For example, the second data format may be a raw data format, an encoded data format for which the media player device has an active codec, or another data format that is otherwise acceptable for the media player device to receive. In some examples, this second data format may be an open encoded data format. As used herein, an open encoded data format may refer to an encoded data format that does not require a paid license or special hardware to transcode. Instead, media data represented using an open encoded data format may be transcoded using an open (free) license and/or standard hardware.

As processing facility 104 performs the transcoding of the media data (e.g., as processing facility 104 transforms the accessed media data representing the media content in the first data format into transcoded media data representing the media content in the second data format), processing facility 104 may provide the transcoded media data to the media player device. For example, processing facility 104 may provide the transcoded media data to the media player device by way of the ultra-low latency communication connection that was established as described above.

In some implementations, system 100 (e.g., processing facility 104) may be configured to perform "just-in-time" transcoding of media data, or, in other words, to transcode the media data in a "just-in-time transcoding manner." Media data transcoding may be performed in a just-in-time transcoding manner when transcoding is performed at render time (i.e., immediately prior to rendering of the media data) as the media data is streaming to the media player device for rendering. For example, as a media data instance (e.g., a media content file, a media content stream, etc.) is being transmitted or streamed to a media player device, just-in-time transcoding may be performed on a first portion of the media data instance concurrently with a second portion of the media data instance (e.g., a portion that has just been transcoded) being rendered by the media player device, and with a third portion of the media data instance (e.g., a portion that has not yet been transcoded) still propagating through the network toward the media player device (e.g., toward the media player device for the first time or returning back toward the media player device in a scenario where the media data instance is accessed from the media player device). Accordingly, just-in-time transcoding may be compatible with how media data is typically transcoded by local, on-device codecs while contrasting with conventional off-device transcoding techniques that involve transcoding media data instances ahead of time and storing transcoded media data instances for later rendering.

As mentioned above, just-in-time transcoding may be particularly powerful when combined with ultra-low latency communication connections that allow media player devices to communicate with network-edge-deployed servers with low latencies such that a user cannot readily perceive any more lag or delay than if the media player device were performing the same tasks locally (i.e., without relying on an external computing system). Accordingly, conventional latency times for even very low latency connections may be insufficient or non-ideal for implementing some of the methods and systems described herein. For example, it may be determined that a user is able to easily perceive a lag or delay of about 100-200 milliseconds or more, thus making such a delay inconvenient and undesirable in certain respects in comparison to local transcoding delays, which may be far less (e.g., less than about 10 milliseconds). Ultra-low latency communications connections may be those that are associated with such small amounts of delay (e.g., less than approximately 10-50 milliseconds) that the delay is not any more perceivable to the users than would be a local transcoding delay.

Figure 2:
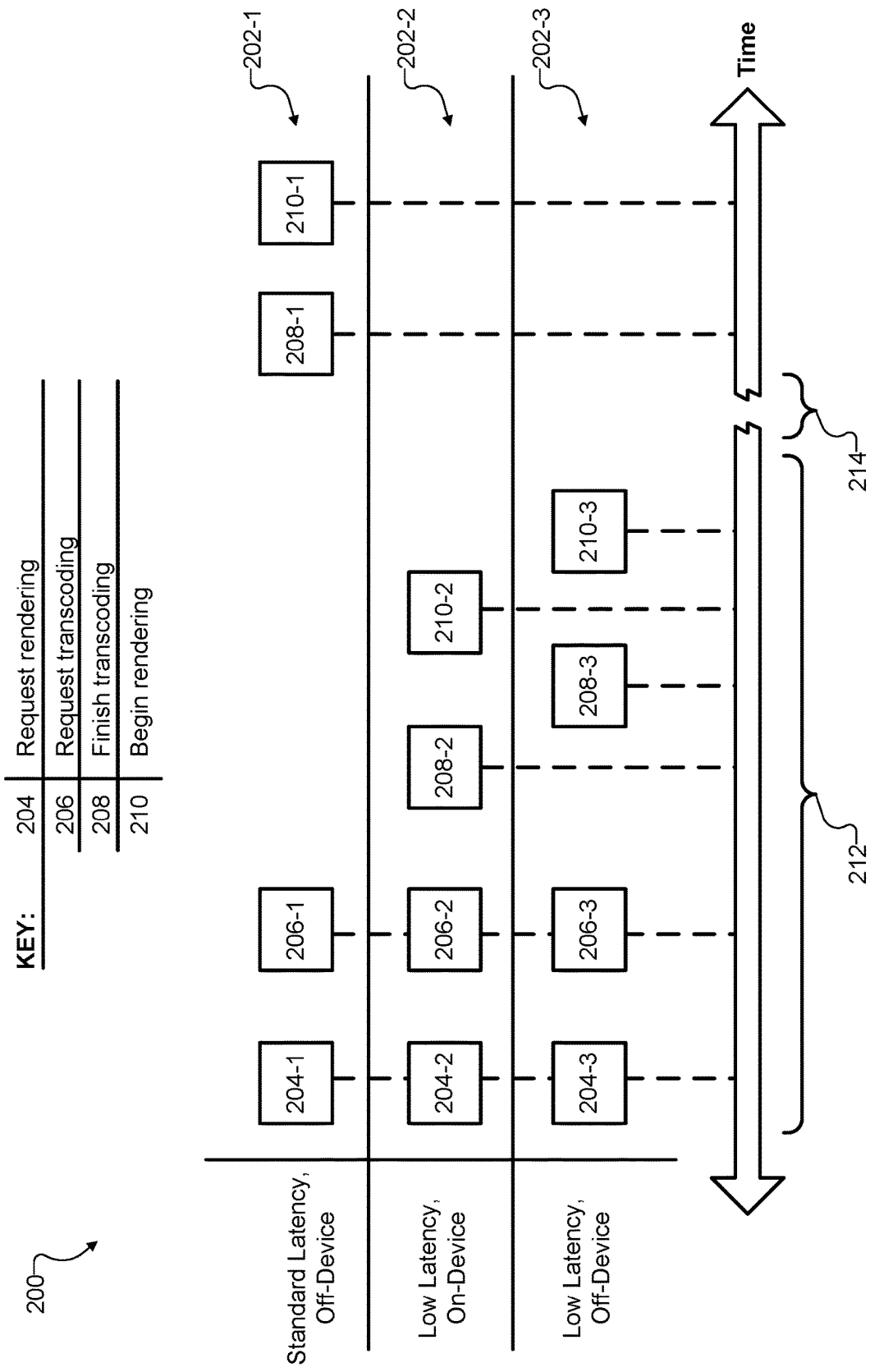
FIG. 2 illustrates an exemplary timeline on which different transcoding scenarios are compared according to principles described herein.

To illustrate, FIG. 2 shows an exemplary timeline 200 on which different transcoding scenarios 202 (e.g., scenarios 202-1 through 202-3) are compared. As shown, a plurality of milestones 204 through 210 (e.g., 204-1 through 210-3) each associated with a respective scenario 202 (i.e., shown on a particular one of the three rows illustrated for scenarios 202) are drawn at different points on timeline 200 in accordance with where the milestones may typically be performed in time. A key at the top of FIG. 2 indicates the action or event that each of milestones 204 through 210 represents. Specifically, a rendering request milestone 204 (e.g., milestone 204-1 through 204-3) may represent a moment in time when a transcoding system (e.g., such as system 100) accesses a particular portion of media data that is to be rendered by a media player device that is communicatively coupled with the transcoding system (e.g., by way of an ultra-low latency communication connection). A transcoding request milestone 206 (e.g., milestone 206-1 through 206-3) may represent a moment in time when the transcoding system determines that the accessed media data will need to be transcoded to represent media content in a different data format. A transcoding finished milestone 208 (e.g., milestone 208-1 through 208-3) may represent a moment in time when the transcoding system finishes transcoding the portion of the media data to represent the media content in the different data format. A begin rendering milestone 210 (e.g., milestone 210-1 through 210-3) may represent a moment in time when the transcoding system has provided the portion of the media data to the media player device and the media player device renders (e.g., presents to a user) the media content represented by the portion of media data.

As illustrated, scenario 202-1 shows a "Standard Latency, Off-Device" scenario in which milestones 204-1 through 210-1 are performed at different points on timeline 200, scenario 202-2 shows a "Low Latency, On-Device" scenario in which milestones 204-2 through 210-2 are performed at different points on timeline 200, and scenario 202-3 shows a "Low Latency, Off-Device" scenario in which milestones 204-3 through 210-3 are performed at different points on timeline 200. While exact timing may vary from implementation to implementation and is not explicitly illustrated for timeline 200, it will be understood that the amount of time in a segment 212 of timeline 200 may represent a relatively short amount of time (e.g., a few milliseconds or tens of milliseconds) for which a delay or lag is not readily perceivable by users, while a segment 214 of timeline 200 may represent a relatively long amount of time (e.g., many tens of milliseconds, hundreds of milliseconds, or more) for which a delay or lag is readily perceivable by users.

A standard off-device transcoding scenario may provide certain advantages of performing off-device media data transcoding (e.g., transcoding by a system other than the media player device) such as that more transcoding resources may be available to transcode a wide variety of data formats and/or to transcode using dedicated resources that do not diminish on-device processing resources, battery life, and so forth. However, as illustrated by scenario 202-1, such a transcoding scenario may also be associated with a significant disadvantage. While rendering request milestone 204-1 and a transcoding request milestone 206-1 may occur at the same time in this scenario as in other scenarios 202 described in more detail below, the transcoding of the media data is not actually finished (finish transcoding milestone 208-1) and the rendering by the media player device does not actually begin (begin rendering milestone 210-1) until after the relatively long delay of segment 214. As will be described in more detail below, this delay may, at best, be inconvenient or an annoyance to a user experiencing the rendered media content and, in some examples, may completely preclude scenario 202-1 for being used to implement certain transcoding applications and use cases.

In contrast, as illustrated by scenario 202-2, a conventional on-device transcoding scenario may finish transcoding and begin rendering media data with no perceivable delay after the rendering and transcoding have been requested. This is shown by milestones 204-2, 206-2, 208-2 and 210-2 all occurring during segment 212 of timeline 200, rather than after the delay of segment 214. However, because the transcoding is performed on-device (i.e., by local resources integrated with the media player device itself), this desirable low latency will be understood to come with a significant disadvantage as well. Unlike the transcoding of scenario 202-1 described above, the transcoding of scenario 202-2 may be performed using fewer transcoding resources that are available on the media player device, resulting, possibly, in fewer data formats being supported, a more significant diminishing of processing resources and battery life of the media player device, higher costs for codec licenses, and so forth.

Network-edge-deployed transcoding methods and systems described herein for just-in-time transcoding of media data may be employed for scenario 202-3 to take advantage of low latency and off-device transcoding benefits while avoiding the corresponding disadvantages described above in relation to scenarios 202-1 and 202-2. Specifically, even if there is slightly more delay between the rendering and transcoding requests (i.e., milestones 204-3 and 206-3) and/or the media data being transcoded and rendered (i.e., milestones 208-3 and 210-3) than is possible when all of these tasks are performed locally on the media player device, because of the ability of system 100 to perform just-in-time transcoding and provide transcoded media data with low latency via the ultra-low latency communication connection described above, all of milestones 204-3 through 210-3 may still be performed during the relatively short segment 212 of timeline 200. As such, no delay (e.g., such as the delay corresponding to segment 214) may be perceived by the user even though the transcoding may benefit from all the advantages of off-device transcoding. In this way, the network-edge-deployed transcoding methods and systems described herein may facilitate increasing the perceived responsiveness of media player devices to users, saving costs associated with media player devices, increasing efficiency of media player device resource usage, and so forth.

The combination of non-perceivable latency with high-resource, off-device data processing and transcoding may be highly convenient for certain applications and use cases. For instance, system 100 may be used to provide traditional media viewing and/or listening experiences to users such as by allowing users to view audiovisual (e.g., video) content such as movies, live television or events, web videos, etc., as well as to listen to audio content such as music, podcasts, live streaming audio (e.g., radio, etc.), and so forth. In certain implementations, system 100 may also be used to facilitate users in experiencing more interactive media content such as video games or extended reality content such as virtual reality content, augmented reality content, mixed reality content, and so forth. For instance, system 100 may provide a single-user extended reality experience such as for a user playing a single-player game, watching an extended reality media program such as an extended reality television show or movie, or the like. Other configurations may employ system 100 in a manner that serves a plurality of users. For example, a multi-user extended reality world may be associated with a multi-player game, a multi-user chat or "hangout" environment, an emergency command center, or any other extended reality world that may be co-experienced by a plurality of users simultaneously. Still other configurations may employ system 100 in a manner that provides media content representative of live, real-time capture of real-world events such as athletic events, concerts or theatrical events, and so forth.

While all of these use cases may benefit from the low-latency, off-device, just-in-time transcoding described herein, certain applications and use cases may not only be improved or made more convenient by the transcoding techniques described herein, but may actually be enabled and made possible by these transcoding techniques.

As one exemplary use case enabled by the network-edge-deployed transcoding methods and systems described herein, for instance, it may be desirable to combine video feeds for live-captured events with real-time, in-person viewing of the events. For example, users in box seats or another lounge area at an event (e.g., a sporting event such as a football game, a concert, etc.) may experience the event live (e.g., by looking through a window to the event taking place) while also socializing and experiencing the event by way of one or more media player devices (e.g., screens placed around the lounge area, personal devices of the users, etc.). In such an example, media data from multiple video feeds (e.g., from multiple cameras capturing the event) may be presented on the media player device, but the media player devices may not have sufficient resources to transcode all of the data in real time. For instance, each media player device may have two codecs that can operate in parallel, while five video content instances from five different cameras capturing the event may need to be transcoded. As such, it may not be possible to handle this scenario with a low latency, on-device approach such as illustrated by scenario 202-2.

Moreover, it may be important that such transcoding seem to occur instantaneously, since any perceivable delay may cause users to feel at odds with or out of synchronization with the ongoing event. For example, it may be undesirable for the real-world crowd at a football stadium to erupt in cheers at the same moment that a delayed media player device is just showing the quarterback winding up to throw a long pass. Accordingly, it may also be unacceptable to handle this scenario with a standard latency, off-device approach such as illustrated by scenario 202-1. Instead, only the low-latency, off-device approach illustrated in scenario 202-3 and performed by system 100 and other systems described herein may provide an appropriate transcoding solution in this use case.

As another exemplary use case enabled by the network-edge-deployed transcoding methods and systems described herein, it may be desirable to generate binaural audio configured to simulate accurate sound propagation for extended reality experiences. For example, an extended reality world may include a plurality of virtual sound sources that surround an avatar of a user within the extended reality world. To accurately simulate virtual sound propagation, sounds to the left of the avatar may be made to simulate interaural level and/or time differences favoring the left ear while sounds to the right of the avatar may be made to simulate such interaural time differences favoring the right ear, and so forth. Properly generating binaural audio that simulates virtual sound propagation may require significant processing resources (e.g., more processing resources than can reasonably be included in a media player device). This is because the extended reality world for which the binaural audio is generated may include a large number of distinct sound sources (e.g., speech from a number of other users and/or non-player characters in the extended reality world, sound effects associated with various people and objects in the extended reality world, movie or music content being presented within the extended reality world, etc.). As such, it may not be possible to handle this scenario with a low latency, on-device approach such as illustrated by scenario 202-2.

At the same time, it may be crucial to the perceived immersiveness of the extended reality scene that the binaural audio generation be performed seemingly instantaneously, since any perceivable delay may be disorienting to the user as he or she moves about and reorients the direction of his or her head during the extended reality experience. For example, it may be undesirable for the binaural audio generation to make a virtual sound appear to come from the left-hand side of the user if the user has now turned to the left so that the virtual sound source is directly ahead of his or her avatar. For these reasons, it may also be unacceptable to handle this scenario with a standard latency, off-device approach such as illustrated by scenario 202-1. Accordingly, here again, only the low-latency, off-device approach illustrated in scenario 202-3 and performed by system 100 and other systems described herein may provide an appropriate transcoding solution in this use case.

Figure 3:
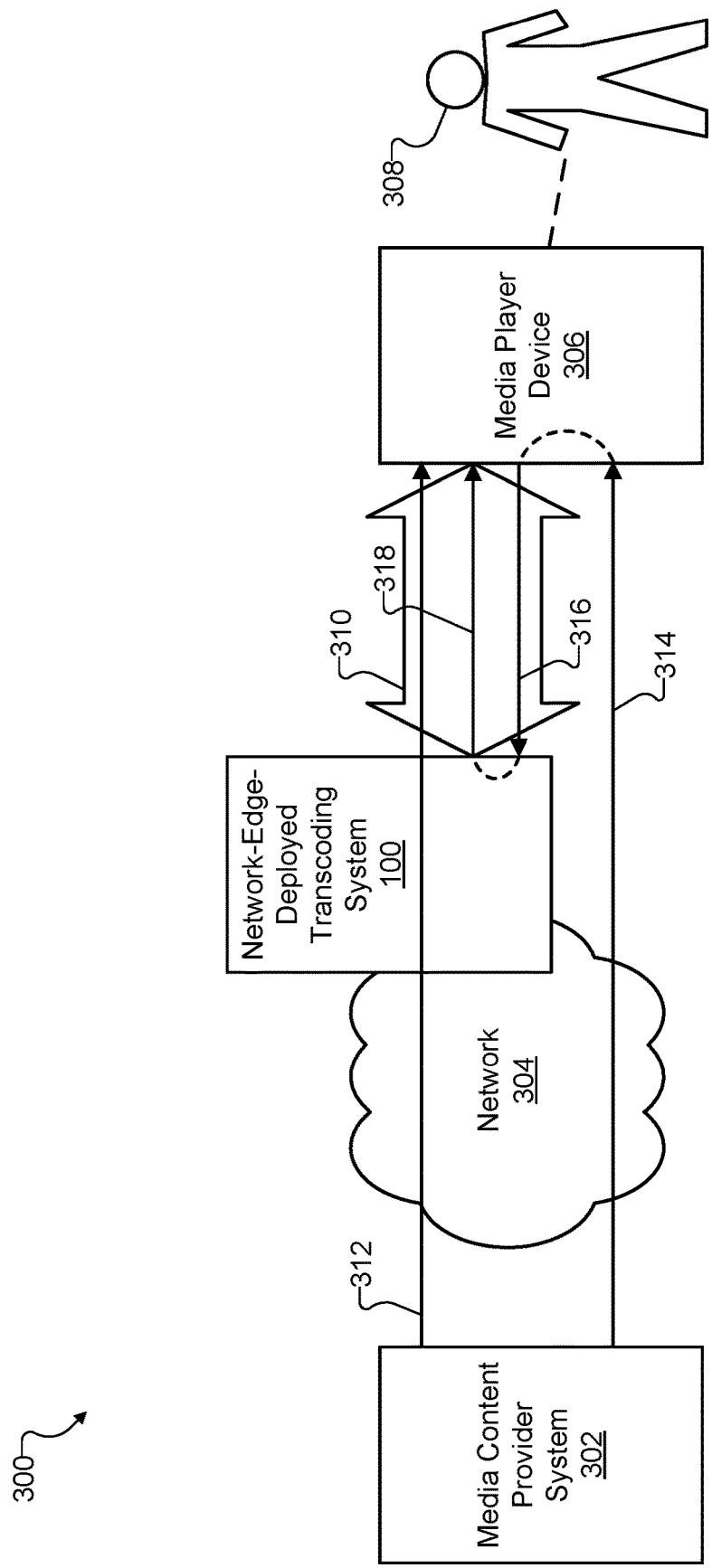
FIG. 3 illustrates an exemplary configuration within which the network-edge-deployed transcoding system of FIG. 1 may operate according to principles described herein.

FIG. 3 illustrates an exemplary configuration 300 within which system 100 may operate. Specifically, as shown, configuration 300 includes a media content provider system 302 that is communicatively coupled, by way of a network 304 that includes or is associated with system 100, with a media player device 306 associated with a user 308.

Media content provider system 302 may be implemented by one or more computing devices or components managed and maintained by an entity that creates, generates, distributes, and/or otherwise provides media data representative of media content to users such as user 308. For example, media content provider system 302 may include or be implemented by one or more server computers maintained by a media content provider such as a media content producer or distributer, a mobile carrier, an Internet service provider, or the like. Media content provider system 302 may provide any of the types of media data described herein to media player device 306 by way of network 304.

Network 304 may provide data delivery between server-side media content provider system 302 and client-side devices such as media player device 306. In order to distribute media data representative of media content from provider systems to client devices, network 304 may include a provider-specific wired or wireless network (e.g., a cable or satellite carrier network, a mobile telephone network, a traditional telephone network, a broadband cellular data network, etc.), the Internet, a wide area network, a local area network, a content delivery network, and/or any other suitable network or networks. Media data may be distributed using any suitable communication technologies implemented or employed by network 304. Accordingly, data may flow between media content provider system 302 and media player device 306 using any communication technologies, devices, media, and protocols as may serve a particular implementation.

Media player device 306 may be implemented by any suitable type of device that may render and present any of the types of media content described herein. For instance, media player device 306 may be implemented as a portable or handheld device such as a smartphone, tablet computer, laptop computer, or the like. In other examples, media player device 306 may be implemented as a larger or more stationary device such as a television, projection device, desktop computer, or the like. In certain examples, media player device 306 may be configured to provide interactive media content experiences such as extended reality experiences. For instance, media player device 306 may be implemented as an extended reality device that includes, for example, a head-mounted display screen, a stereo headset, and one or more controller devices communicatively coupled to the head-mounted display screen. Additionally, certain implementations of media player device 306 may not include any type of screen at all, but may instead include one or more loudspeakers configured to render audio content.

As shown, system 100 may be implemented at an edge of network 304. For instance, system 100 may be implemented by one or more network-edge-deployed servers and/or other suitable computing systems or resources that may each interoperate with media player device 306 with a low enough latency to allow for the just-in-time transcoding described herein. To this end, as described above, system 100 may communicate with media player device 306 by way of an ultra-low latency communication connection 310 ("connection 310") that may leverage MEC technologies, 5G cellular technologies, and so forth to enable computing capabilities at the edge of network 304. While, as illustrated, system 100 may be integrated with various components of a cellular network or the like included within network 304, it will be understood that, in certain examples, network-edge-deployed computing resources implementing system 100 may be more localized to media player device 306. For instance, certain network-edge-deployed servers may be implemented by computing resources on a same local area network with media player device 306 (e.g., by computing resources located within a home or office of user 308 such as a router with a fiber optic connection to network 304), or the like.

As will now be described in more detail, media content provider system 302 may be configured to transmit various types of media data instances to media player device 306 by way of network 304. For example, media data (or a media data instance) may be transmitted by way of a media data stream being streamed from media content provider system 302 to media player device 306, a media data file being downloaded or otherwise transferred from media content provider system 302 to media player device 306, or any other suitable instance of media data being transferred from media content provider system 302 to media player device 306. In some examples, media data may be prerecorded and stored by media content provider system 302 to be sent to media player device 306 on request. In other examples, media data may represent live-captured media content that is streaming to media player device 306 as it is being captured in real time.

As media content provider system 302 provides media data to media player device 306, there are at least two major paradigms that may be used to transcode the media data for rendering by media player device 306. One paradigm will be referred to herein as a "passive" transcoding paradigm and will now be described in relation to FIGS. 3 and 4. The other paradigm will be referred to herein as an "on-demand" transcoding paradigm and will be described below in relation to FIGS. 3 and 5.

In passive just-in-time transcoding examples, system 100 may access media data by receiving the media data from media content provider system 302 while the media data is being communicated from media content provider system 302 to media player device 306 and before media player device 306 has received the media data. For example, a passive just-in-time transcoding example is illustrated by a media data transmission 312 that is shown in FIG. 3 to originate from media content provider system 302 and to pass through system 100 before continuing on to media player device 306 by way of connection 310.

As media data transmission 312 is en route to media player device 306, system 100 may transcode the media data from representing media content in one data format to representing media content in another data format in any of the ways described herein. In so doing, system 100 may determine which data format to represent the media data sent to media player device 306 in any suitable way. For example, as described above, while the media data coming into system 100 may represent media content in a proprietary encoded data format, system 100 may transcode the media data to represent the same media content in an open encoded data format.

The determination of which data format (e.g., which open encoded data format, which raw data format, etc.) to use for media data passed on to media player device 306 may be performed by system 100 based on particular resources of media player device 306 (e.g., active codecs, etc.), particular capabilities of media player device 306 (e.g., processing capabilities, etc.), particular characteristics of media player device 306 (e.g., assignments allowing or disallowing various data formats, etc.), an explicit request from media player device 306, or based on any other suitable criteria. In some examples, resources, capabilities, and/or characteristics of media player device 306 may be determined by identifying media player device 306 as being part of a class of media player devices (e.g., a class associated with a particular manufacturer, a particular device model, a particular operating system, etc.). In other examples, the resources, capabilities, and/or characteristics of media player device 306 may be determined by requesting and receiving such information from media player device 306 itself, or by requesting an identification (e.g., a serial number or the like) from media player device 306 and using the identification to access such information from a data store that tracks the information for a plurality of media player devices including media player device 306.

More specifically, upon establishing connection 310, system 100 may identify media player device 306, along with other media player devices (not shown) with which connection 310 has been established. Based on the identifying of the media player device, system 100 may determine that a first data format in which accessed media content (e.g., media content represented by media data transmission 312) is represented is disallowed from being provided to media player device 306. Further based on the identifying of media player device 306, system 100 may also determine, in any of the ways described herein, that a second data format (e.g., a different encoded data format or a raw data format) is allowed to be provided to media player device 306. System 100 may then perform the transcoding of the media data and the providing of the transcoded media data to media player device 306 in response to the determinations that the first data format is disallowed and that the second data format is allowed. For instance, system 100 may transcode the media data to represent the media content in the second data format rather than the first data format.

Figure 4:
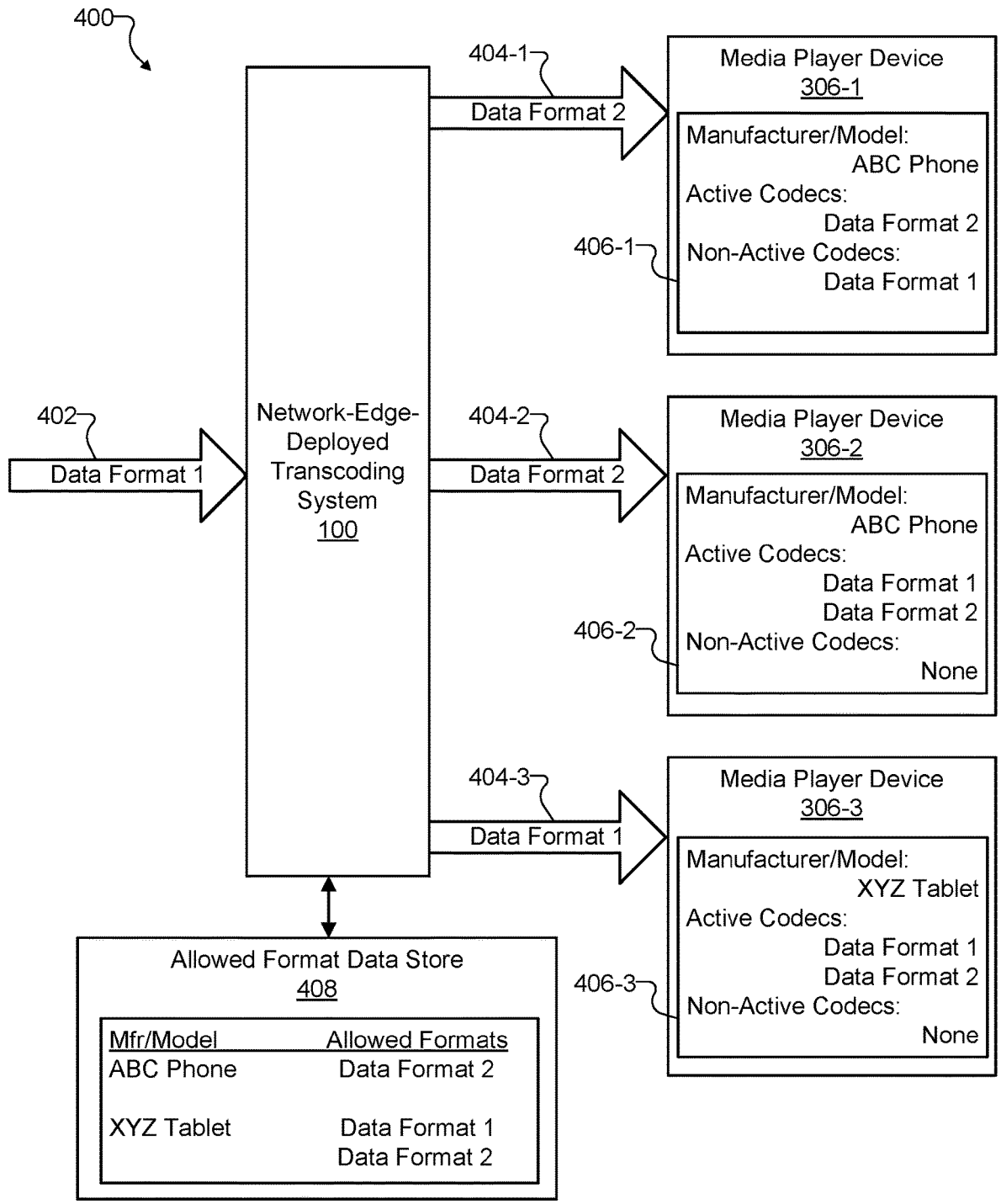
FIG. 4 illustrates an exemplary passive transcoding of media data by the network-edge-deployed transcoding system of FIG. 1 for different media player devices having different characteristics according to principles described herein.

To illustrate, FIG. 4 shows an exemplary passive transcoding 400 of media data by system 100 for different media player devices having different characteristics. As shown in FIG. 4, system 100 may receive media data 402 that is encoded in a first data format ("Data Format 1") and is intended for a plurality of media player devices 306 (e.g., media player devices 306-1 through 306-3) that each represent an implementation of media player device 306 described above. Different instances of media data 404 (e.g., media data 404-1 through 404-3) are provided by system 100 to each of media player devices 306, some of which may be automatically and passively transcoded to a second data format ("Data Format 2") while others remain unchanged in the first data format ("Data Format 1").

As described above, the data format of a respective media data 404 instance transmitted to a particular media player device 306 may be determined based on identification information and/or characteristics of a respective media player device 306. To illustrate, each of media player devices 306 is shown to be associated with a description of certain characteristics 406 associated with that media player device. Specifically, media player device 306-1 is shown to include characteristics 406-1 indicating that media player device 306-1 is of a particular manufacturer and model ("ABC Phone"), that it is equipped with an active codec for one particular data format ("Data Format 1"), and that it is not equipped with an active code for another particular data format ("Data Format 2"). Media player device 306-2 is shown to include characteristics 406-2 indicating that media player device 306-2 is of the same manufacturer and model as media player device 306-1 ("ABC Phone"), but that, in contrast with media player device 306-1, media player device 306-2 is equipped with active codecs for both data formats ("Data Format 1" and "Data Format 2"). Media player device 306-3 is shown to include characteristics 406-3 indicating that media player device 306-3 is of a different manufacturer and model than media player devices 306-1 and 306-2 ("XYZ Tablet"), but that, like media player device 306-2, media player device 306-3 is equipped with active codecs for both data formats ("Data Format 1" and "Data Format 2").

As used herein, an "active codec" may refer to a codec (encoder/decoder) that is fully licensed and operational for transcoding media content from being represented in one particular data format (e.g., a raw or encoded data format) to being represented in a different data format (e.g., a different raw or encoded data format). To transcode to or from proprietary encoded data formats, an active codec typically requires that a license fee be paid for use of the proprietary encoded data formats.

In some examples, a media player device that lacks an active codec for a particular data format may simply not include any type of codec associated with that data format. In other examples, however, a media player device that lacks an active codec for a particular data format may in fact include a non-active codec for the particular data format. As used herein, a "non-active codec" may refer to hardware and/or software that is capable of performing the transcoding operations described herein with respect to the particular data format, but that is not licensed or otherwise activated so as to be operational. For example, software required to perform the transcoding operations described herein may be stored on the media player device in "dark code" (e.g., dormant code that has not been linked in the software build process or that is otherwise unavailable for use).

Whether a codec is "active" or "non-active" may depend on various factors, and may change from usage session to usage session. For example, in a usage session during which a media player device is connected to a data carrier network associated with one data carrier, a particular codec may be non-active because the data carrier network may never require the media player device to use that codec by disallowing the corresponding data format from being provided to that media player device. In this way, a license fee associated with the particular codec (e.g., if the particular codec is associated with a proprietary encoded data format) may be avoided such that cost savings accrue to the data carrier and/or the user of the media player device.

Conversely, in a different usage session during which the media player device is roaming on a different data carrier network associated with a second data carrier, the same particular codec may be made active because the second data carrier network may operate under an assumption that the media player device has an active codec for the data format in question and may thus provide media data representing media content in that data format. Accordingly, for this carrier network and/or this usage session, an appropriate license fee must be paid for use of the active codec.

In some examples, system 100 may identify media player devices 306 based on certain characteristics such as the manufacturer of the media player device, the model of the media player device, or the like. However, it may not be possible or convenient for system 100 to request all the details about which codecs may or may not be loaded and/or activated on the media player device. As such, an allowed format data store 408 (e.g., a database or other suitable form of storage facility) may be integrated with or in communication with system 100 to indicate which data formats are "allowed" or "disallowed" for different manufacturers and models of media player devices. To illustrate, allowed format data store 408 indicates that for media player devices 306 of the "ABC Phone" manufacturer and model ("Mfr/Model"), only Data Format 2 is allowed to be provided. In contrast, as further shown in allowed format data store 408, media player devices 306 of the "XYZ Tablet" manufacturer and model are allowed to receive media content represented using either Data Format 1 or Data Format 2.

Consequently, as shown, upon receiving media data 402 that uses the first data format (i.e., Data Format 1), system 100 determines that media player device 306-1 is to receive media data 404-1 represented in the second data format (i.e., Data Format 2) because allowed format data store 408 indicates that an "ABC Phone" such as media player device 306-1 is only allowed to receive media data represented using Data Format 2. Accordingly, as shown, system 100 transcodes media data 402 from Data Format 1 to Data Format 2 before transmitting media data 404-1 to media player device 306-1. It is important that media player device 306-1 only receive media data encoded with Data Format 2 because, as shown in characteristics 406-1, Data Format 2 is the only format for which media player device 306-1 has an active codec.

In the case of media player device 306-2, system 100 determines that media player device 306-2 is to receive media data 404-2 represented using Data Format 2 again because allowed format data store 408 indicates that all "ABC Phones" (including media player device 306-2) are only allowed to receive media data represented using Data Format 2. Accordingly, as with media data 404-1 above, system 100 uses Data Format 2 in the media data 404-2 transmitted to media player device 306-2. It will be noted that, in accordance with the assignments represented in allowed format data store 408, media player device 306-2 is only allowed to receive media data represented using Data Format 2 although media player device 306-2 also includes an active codec for Data Format 1. It may be desirable for certain allowed encoding assignments to overreach in this way (e.g., disallowing data formats that would not actually cause any problem for certain media player devices) because, for example, new ABC Phones coming onto the network may advantageously avoid license fees for certain active codecs (even if license fees for other ABC Phones on the network have already been paid) without risking receiving incompatible media data (e.g., media data that the new ABC Phones do not have an active codec capable of handling).

In the case of media player device 306-3, system 100 determines that media player device 306-3 can receive media data 404-3 represented using either Data Format 1 or Data Format 2 because allowed format data store 408 indicates that all "XYZ Tablets" (including media player device 306-3) are allowed to receive media data encoded using either data format. Accordingly, system 100 may use Data Format 1 in the media data 404-3 transmitted to media player device 306-3. For example, media data 404-3 may be a simple pass-through of media data 402 that does not require transcoding operations to be performed by system 100. In other examples, if it is more convenient or otherwise advantageous for system 100 to provide media data 404-3 using Data Format 2 rather than Data Format 1 (e.g., if transcoding operations to Data Format 2 have already been performed for the benefit of media player devices 306-1 and 306-2), system 100 may also provide media data 404-3 using Data Format 2 since both data formats are allowed.

Referring again to FIG. 3, along with the passive transcoding paradigm illustrated by media data transmission 312, configuration 300 also depicts various media data transmissions 314, 316, and 318 that collectively illustrate an example of the on-demand transcoding paradigm mentioned above. In on-demand just-in-time transcoding examples, system 100 may access media data by receiving the media data from media player device 306, rather than from another source such as media content provider system 302. Additionally, along with receiving the media data itself from media player device 306, system 100 may further receive other information such as a request from media player device 306 to transcode the media data, use-case-specific data configured to facilitate or enable certain processing of the media data, or the like.

As shown in FIG. 3, media data may be provided to media player device 306 by way of media data transmission 314 at some point in time. For instance, media content provider system 302 may provide the media data at an earlier point in time for media player device 306 to buffer (e.g., for a few seconds or minutes) or store (e.g., for days or longer) prior to a time when the media content represented in the media data is to be rendered. In other examples, media content provider system 302 may provide media data 314 at render time for media player device 306 to render immediately as the media data is received. Regardless of the timing with which media data 314 is received, media player device 306 may transmit the media data to system 100 as part of media data transmission 316 for just-in-time transcoding as media player device 306 renders the media content. As system 100 performs the just-in-time transcoding of the media content represented in this media data, system 100 may send transcoded media data back to media player device 306 in media data transmission 318.

Figure 5:
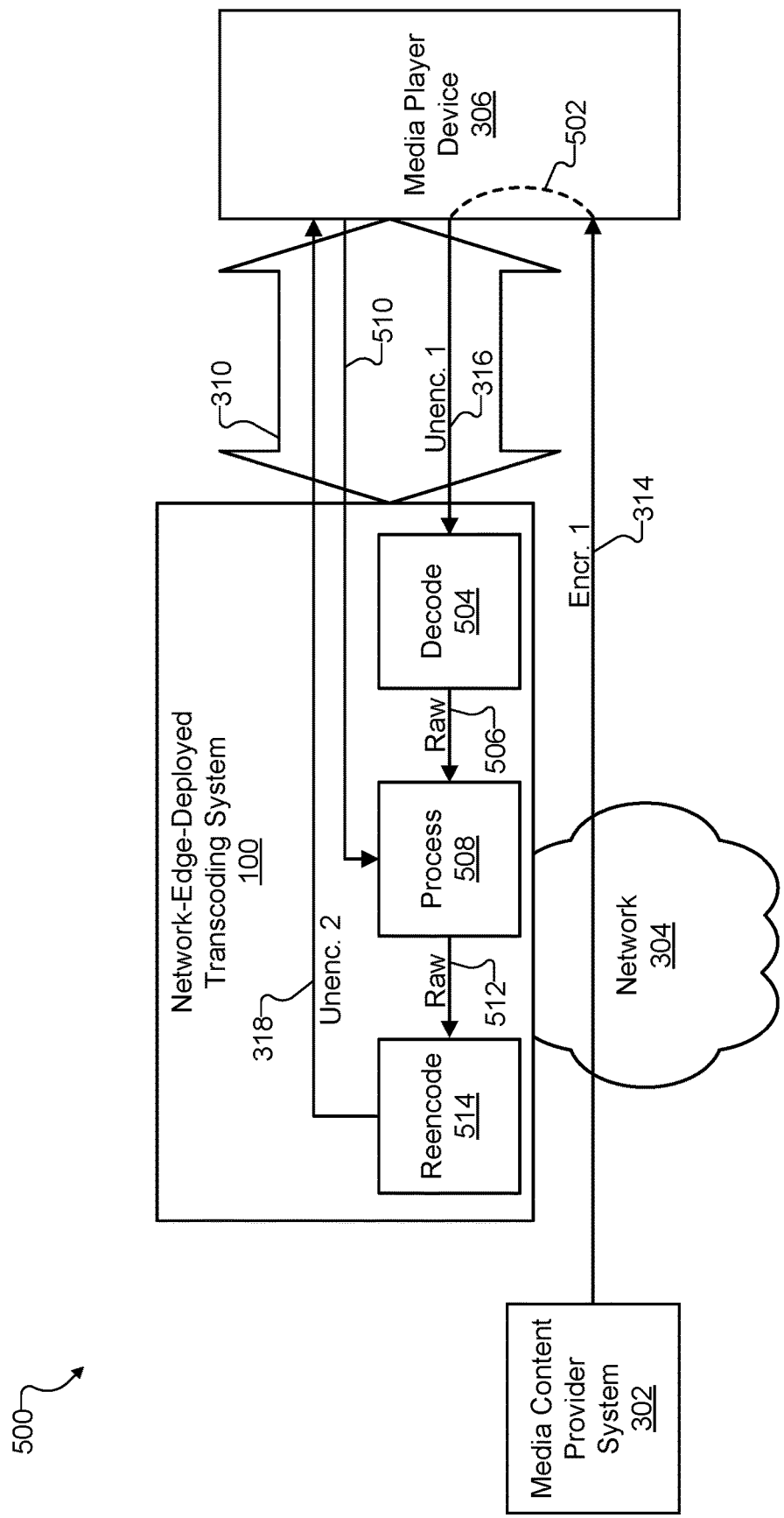
FIG. 5 illustrates an exemplary on-demand transcoding of media data by the network-edge-deployed transcoding system of FIG. 1 according to principles described herein.

To illustrate an example of this on-demand just-in-time transcoding in more detail, FIG. 5 shows an exemplary on-demand transcoding 500 of media data by system 100. As in FIG. 3, FIG. 5 shows that media content provider system 302 provides media data to media player device 306 over network 304 by way of media data transmission 314. In this example, as noted in FIG. 5 next to media data transmission 314 ("Encr. 1"), the media data transmitted as part of media data transmission 314 will be assumed to be encrypted ("Encr.") and to be encoded using a first data format ("1"). As such, a decryption operation 502 may be performed in media player device 306 prior to media player device 306 transmitting the media data to system 100 using connection 310 in media data transmission 316. Thus, as noted in FIG. 5 next to media data transmission 316 ("Unenc. 1"), the media data received by system 100 from media player device 306 is an unencrypted ("Unenc.") version of the media data that is still encoded using the first data format ("1").

There are various reasons that on-demand transcoding may be used rather than passive transcoding. As one example, media player device 306 may store media data encoded in a data format for which media player device 306 does not have an active codec, and media player device 306 may thus use the just-in-time transcoding of system 100 as a replacement for on-device transcoding when it comes time to render the media data. Even if, however, the media data is being received directly from media content provider system 302 at the time that the media data is to be rendered, there still may be good reason for the media data to be received by media player device 306 (rather than system 100) before being looped back to system 100 for transcoding. One such reason, for example, is that the original media data may be encrypted end-to-end by media content provider system 302 so that only media player device 306 may be able to decrypt and process the encrypted data (i.e., the encryption may not allow for passive processing by systems such as system 100 that the media data passes through on the way to media player device 306).

In such examples, the unencrypted version of the media data generated by media player device 306 and sent on media data transmission 316 may thus be based on an end-to-end encrypted version of the media data received and decrypted by media player device 306. In similar examples, the unencrypted version based on the end-to-end encrypted version of the media data may not be sent to system 100 as such, but, rather, the unencrypted version may first be re-encrypted to generate a version of the media data that system 100 will be able to decrypt itself. This may allow for an added degree of security and data protection for the media data communicated over connection 310.

In some examples, when system 100 receives the unencrypted media data representing media content in the first data format (i.e., media data transmission 316), system 100 may directly transcode the unencrypted media data from representing the media content in the first data format to representing the media content in a second data format (e.g., a requested data format, an allowed data format according to an allowed format data store such as allowed format data store 408 in FIG. 4, etc.). For instance, the first data format may be a first encoded data format and the second data format may be a second encoded data format distinct from the first encoded data format. As such, the transcoding of the media data may be performed by decoding the media data from the first encoded data format to a raw data format, and reencoding the media data represented in the raw data format to be represented in the second encoded data format. For instance, to use a specific audio data example, audio content may be encoded in an MP3 data format (the first encoded data format), decoded into a PCM data format (the raw data format), and then reencoded into an Ogg Vorbis data format (the second encoded data format) before being provided back to media player device 306 on media data transmission 318.

In other examples, system 100 may be configured to further process the media data in any suitable way as part of the just-in-time transcoding. For instance, along with accessing the media data from media player device 306, system 100 may also access additional, use-case-specific data to facilitate additional, use-case-specific processing of the media data. In these examples, the first data format may be an encoded data format and the transcoding of the media data may be performed by decoding the media data from the encoded data format to a raw data format; generating, based on the additional data and the decoded media data in the raw data format, processed media data distinct from the decoded media data; and, if applicable, reencoding the media data represented in the raw data format to be encoded in a second data format implemented as a different encoded data format. The transcoded media data provided back to media player device 306 on media data transmission 318 may be based on the processed media data. For instance, the transcoded media data may be the reencoded media data or, in certain examples where the reencoding step may not be performed, the transcoded media data may be the processed media data represented in the raw data format.

To illustrate this latter group of examples where further processing of the media data is performed as part of the just-in-time transcoding, the implementation of system 100 depicted in FIG. 5 is shown to include a functional diagram with various functional blocks and data transmissions between them. For example, system 100 is shown to include a decode block 504 that decodes media data from media data transmission 316 to generate a media data transmission 506 that represents the media content in a raw data format (notated as "Raw" next to media data transmission 506). System 100 is further shown to include a process block 508 that performs processing operations with respect to media data transmission 506 from decode block 504 and an additional data transmission 510 from media player device 306. Based on media data transmission 506 and additional data transmission 510, process block 508 generates a processed media data transmission 512 that represents the processed media content in the raw data format (notated as "Raw" next to processed media data transmission 512). System 100 also includes a reencode block 514 that encodes the raw media data received in processed media data transmission 512 into a second data format determined to be allowed for, requested by, or otherwise acceptable to send to media player device 306. Media data transmission 318 is representative of this reencoded version of the processed media data, and is notated as being unencrypted ("Unenc.") and as representing the media content in the second data format ("2"). As described above, media data transmission 318 is then shown to be provided by way of connection 310 back to media player device 306 for rendering by media player device 306.

The additional processing performed in process block 508 as part of on-demand transcoding 500 may be any suitable use-case-specific processing that takes advantage of any suitable additional data (e.g., use-case-specific data) as may serve a particular implementation. For instance, one exemplary use case may involve live-streamed media data that is to be automatically edited for explicit content in real time as the media data streams from media content provider system 302 to media player device 306. In this example, the additional data in additional data transmission 510 may be user preference data representative of a preferred manner of performing an altering of the media content encoded in media data transmission 314 from an original version to an altered version (e.g., an altered version that is to be rendered by media player device 306 in place of the original version when media player device 306 renders the media content). For example, user 308 (or a parent of user 308 or the like) may desire to remove certain explicit language from an instance of streaming audio content (e.g., a web radio program, a podcast, etc.) encoded on media data transmission 314 from media content provider system 302. As such, additional data transmission 510 may be representative of a list of explicit words and/or phrases that are to be removed from the audio content. As another example, user 308 may desire to remove scenes of graphic violence from an instance of streaming audiovisual content (e.g., a movie, a web video, etc.) encoded on media data transmission 314. In this case, additional data transmission 510 may be representative of various criteria indicative of the type of graphic violence that is to be removed from the audiovisual content.

In process block 508, system 100 may generate the processed media data of processed media data transmission 512 by altering the media content from the original version to the altered version in accordance with the user preference data received in additional data transmission 510. For example, system 100 may modify the audio content to bleep out or otherwise remove all uses of the list of explicit words and/or phrases in the first example above, or may modify the audiovisual content to black out or otherwise remove graphic violence that meets the various criteria in the second example above. This altering of the media content may be performed in any suitable way. For instance, machine learning and/or artificial intelligence technologies may be employed to determine when media content needs to be altered to accord with the user preference (e.g., when certain explicit language is used, when a scene includes graphic violence, etc.). Such technologies may be configured to process the media data automatically and in real time (e.g., without any noticeable delay to user 308), and, as such, may require significant processing resources that may only be reasonably integrated with a server-side system such as system 100 (i.e., may not be reasonably integrated with the resources of a small media player device 306 such as a personal mobile device). When the processing associated with process block 508 is complete, media data transmission 512 may include media data representative of the altered version of the media content (e.g., a version of the media content with the explicit content removed).

Another exemplary use case for the off-device processing paradigm of on-demand transcoding 500 relates to the generation of the binaural audio to simulate virtual sound propagation for the extended reality world mentioned above. In this example, the media content in media data transmission 314 may include audio content (e.g., audio from various virtual sound sources within an extended reality world that user 308 is experiencing), and the additional data in additional data transmission 510 may include head pose data representative of a real-time position and orientation of a head of an avatar of user 308 as user 308 experiences the extended reality world by way of media player device 306. In process block 508, system 100 may generate the processed media data of processed media data transmission 512 by generating a composite binaural audio stream that is to be rendered by media player device 306 as user 308 experiences the extended reality world. For example, as described above, the composite binaural audio stream may be representative of sounds that originate from a plurality of virtual sources within the extended reality world and that are combined, based on the head pose data, to account for virtual acoustic propagation of the sounds to the avatar (e.g., such that sounds will be perceived to originate from an appropriate direction, such that a head-related transfer function is imposed on the audio data to simulate a head shadow of the avatar, etc.). When the processing associated with process block 508 is complete, media data transmission 512 may include media data representative of the composite binaural audio stream that, when rendered by media player device 306, will provide a realistic sound representation accounting for real-time head movements of user 308.

Figure 6:
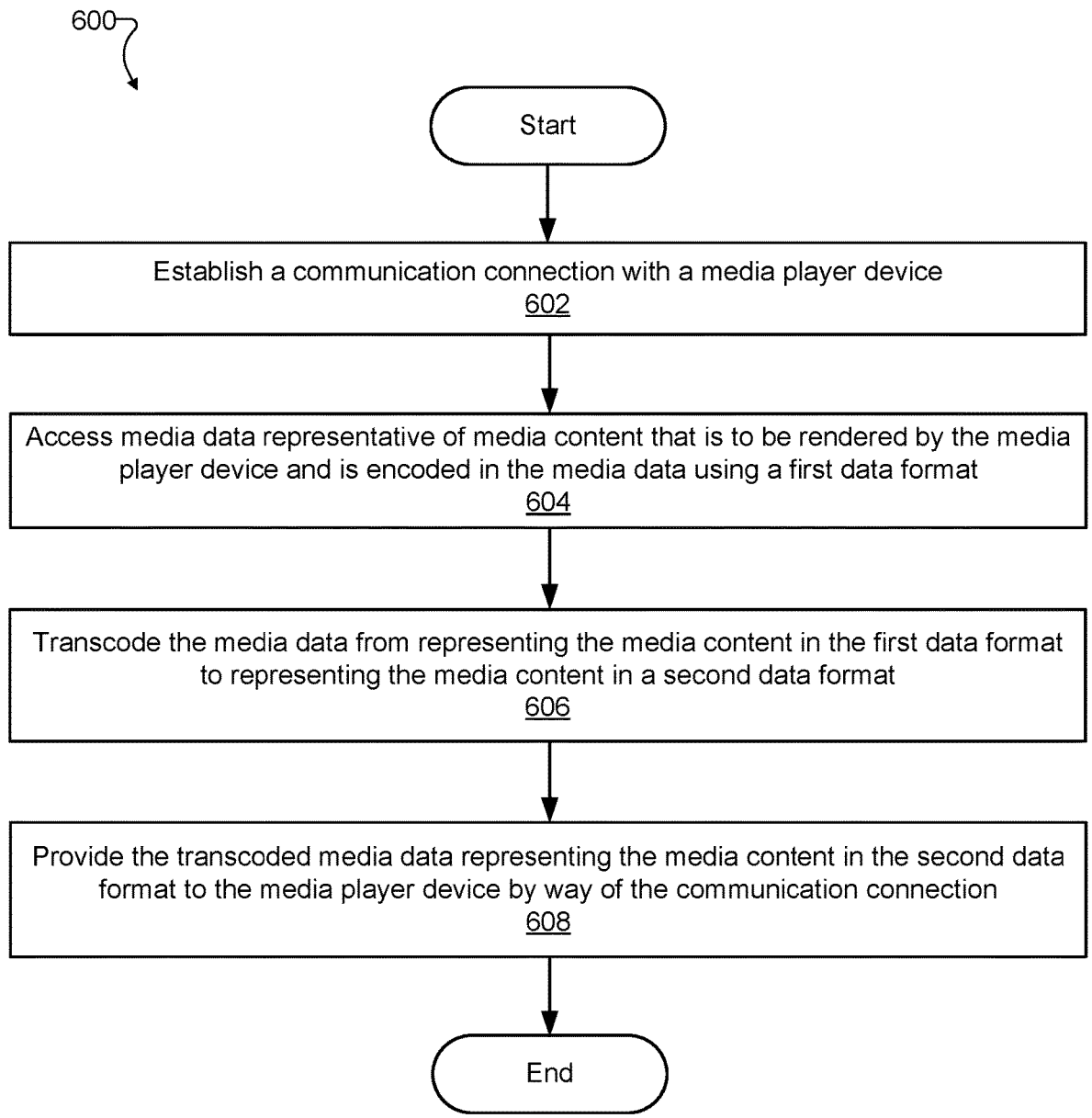
FIG. 6 illustrates an exemplary network-edge-deployed transcoding method for just-in-time transcoding of media data according to principles described herein.

FIG. 6 illustrates an exemplary network-edge-deployed transcoding method 600 for just-in-time transcoding of media data. While FIG. 6 illustrates exemplary operations according to one embodiment, other embodiments may omit, add to, reorder, and/or modify any of the operations shown in FIG. 6. One or more of the operations shown in FIG. 6 may be performed by system 100, any components included therein, and/or any implementation thereof.

In operation 602, a network-edge-deployed transcoding system may establish a communication connection with a media player device that is distinct from the network-edge-deployed transcoding system. Operation 602 may be performed in any of the ways described herein.

In operation 604, the network-edge-deployed transcoding system may access media data representative of media content that is to be rendered by the media player device. In some examples, the media content may be represented in the media data using a first data format. Operation 604 may be performed in any of the ways described herein.

In operation 606, the network-edge-deployed transcoding system may transcode the media data. For instance, the network-edge-deployed transcoding system may transcode the media data from representing the media content in the first data format to representing the media content in a second data format. In some examples, the network-edge-deployed transcoding system may transcode the media data in a just-in-time transcoding manner as the media player device renders the media content. Operation 606 may be performed in any of the ways described herein.

In operation 608, the network-edge-deployed transcoding system may provide the transcoded media data representing the media content in the second data format to the media player device. For example, the network-edge-deployed transcoding system may provide the transcoded media data to the media player device by way of the communication connection established in operation 602. In some implementations, the providing of the transcoded media data in operation 608 may be performed as the transcoding of the media data is performed as part of operation 606. Operation 608 may be performed in any of the ways described herein.

Figure 7:
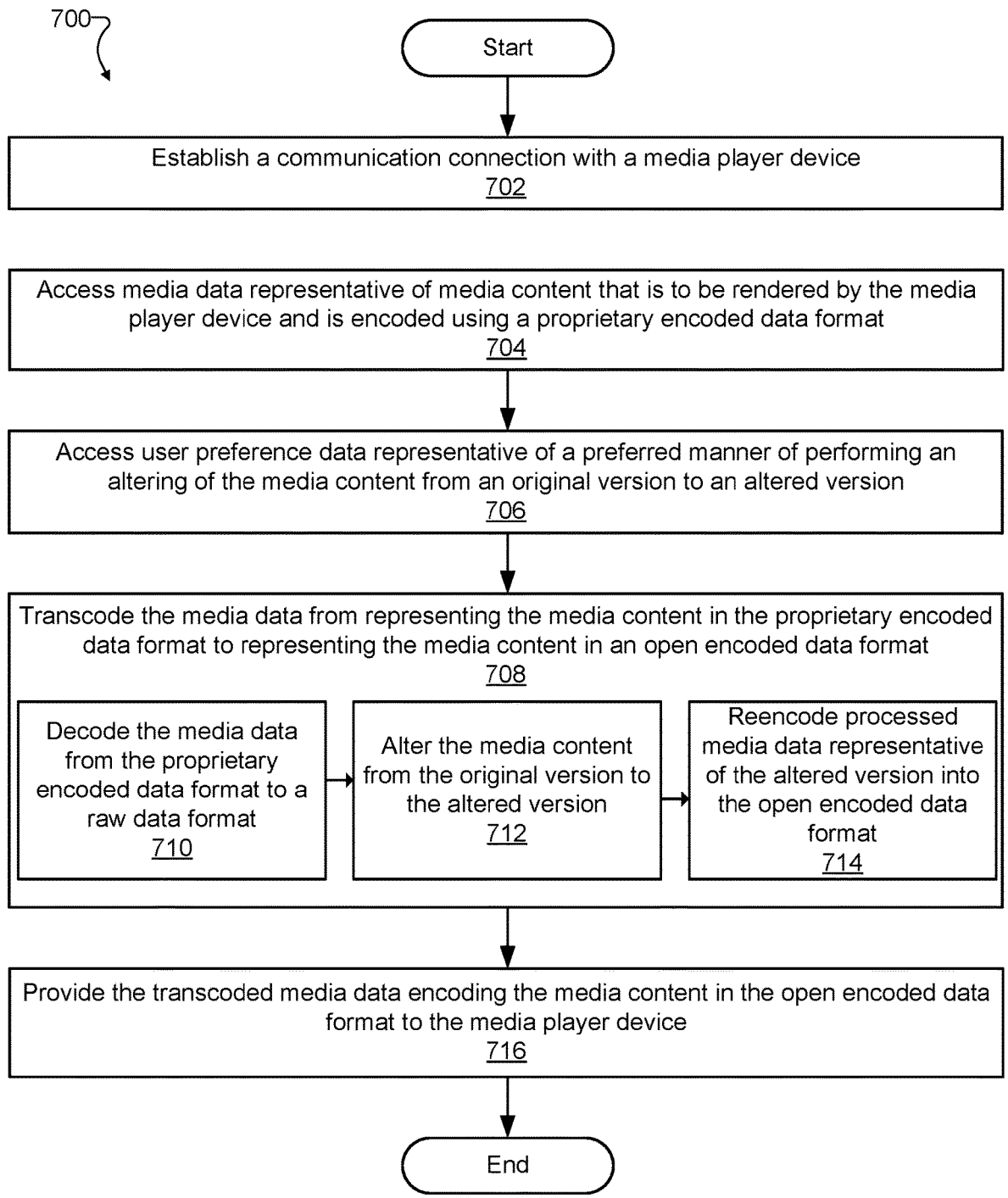
FIG. 7 illustrates another exemplary network-edge-deployed transcoding method for just-in-time transcoding of media data according to principles described herein.

FIG. 7 illustrates another exemplary network-edge-deployed transcoding method 700 for just-in-time transcoding of media data. While FIG. 7 illustrates exemplary operations according to one embodiment, other embodiments may omit, add to, reorder, and/or modify any of the operations shown in FIG. 7. One or more of the operations shown in FIG. 7 may be performed by system 100, any components included therein, and/or any implementation thereof.

In operation 702, a network-edge-deployed transcoding system may establish a communication connection with a media player device that is distinct from the network-edge-deployed transcoding system. Operation 702 may be performed in any of the ways described herein.

In operation 704, the network-edge-deployed transcoding system may access media data representative of media content that is to be rendered by the media player device. In some examples, this media content may be encoded in the media data using a proprietary encoded data format. Operation 704 may be performed in any of the ways described herein.

In operation 706, the network-edge-deployed transcoding system may access user preference data along with the media data accessed as part of operation 704. For instance, the user preference data may be representative of a preferred manner of performing an altering of the media content from an original version of the media content to an altered version of the media content that is to be rendered by the media player device in place of the original version when the media player device renders the media content. Operation 706 may be performed in any of the ways described herein.

In operation 708, the network-edge-deployed transcoding system may transcode the media data from representing the media content in the proprietary encoded data format to representing the media content in an open encoded data format. For instance, in certain implementations, the network-edge-deployed transcoding system may transcode the media data in a just-in-time transcoding manner as the media player device renders the media content. Operation 708 may be performed in any of the ways described herein. For example, as shown, operation 708 may be performed by way of sub-operations 710, 712, and 714.

In sub-operation 710, the network-edge-deployed transcoding system may decode the media data from the proprietary encoded data format to a raw data format. Sub-operation 710 may be performed in any of the ways described herein.

In sub-operation 712, the network-edge-deployed transcoding system may alter the video content from the original version to the altered version in accordance with the user preference data. For example, the network-edge-deployed transcoding system may alter the media content based on the user preference data accessed in operation 706, as well as based on the media data in the raw data format decoded in sub-operation 710. As the network-edge-deployed transcoding system alters the media content in sub-operation 712, the network-edge-deployed transcoding system may represent the altered version of the media content within processed media data distinct from the decoded media data. Sub-operation 712 may be performed in any of the ways described herein.

In sub-operation 714, the network-edge-deployed transcoding system may reencode the processed media data into the open encoded data format. Sub-operation 714 may be performed in any of the ways described herein.

In operation 716, the network-edge-deployed transcoding system may provide the transcoded media data representing the media content in the open encoded data format to the media player device. For example, the network-edge-deployed transcoding system may provide the transcoded media data to the media player device by way of the communication connection established in operation 702. In certain implementations, the network-edge-deployed transcoding system may provide the transcoded media data in operation 716 as the transcoding of the media data is being performed as part of operation 708 (e.g., as sub-operations 710, 712, and 714 are being performed). Operation 716 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 8:
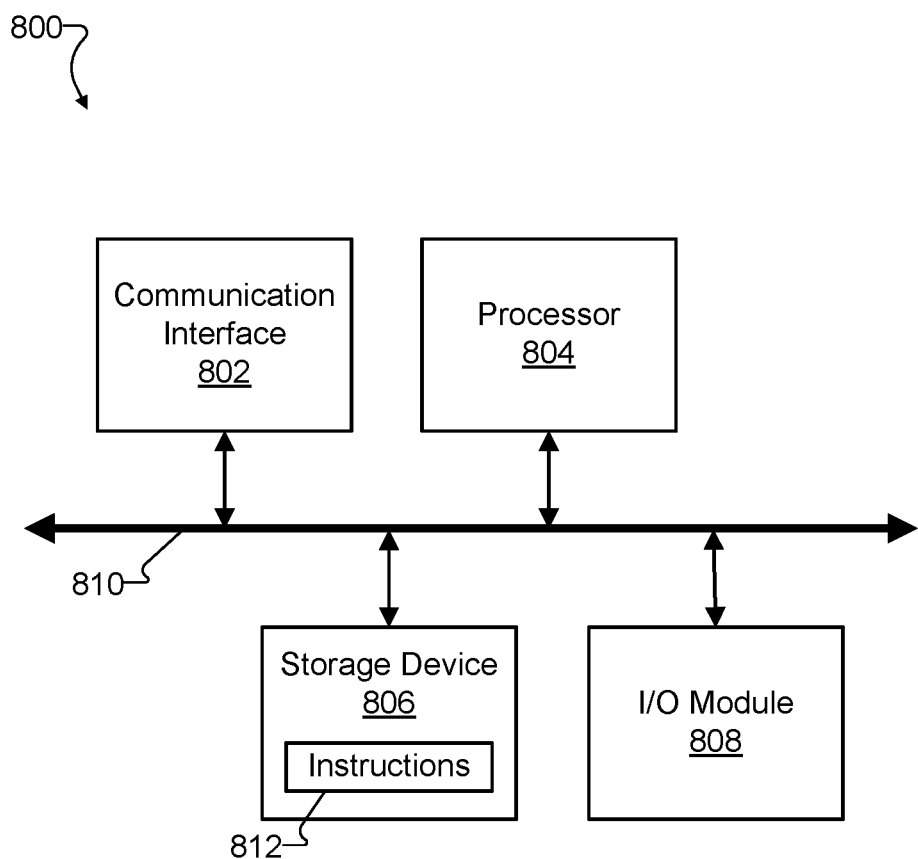
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons. I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 800. For example, storage facility 102 of system 100 may be implemented by storage device 806. Likewise, processing facility 104 of system 100 may be implemented by processor 804.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

establishing, by a Multi-access Edge Computing ("MEC") system deployed on a cellular data network, respective network connections with a plurality of media player devices that are connected to the cellular data network and are distinct from one another and from the MEC system;

accessing, by the MEC system by way of a particular network connection of the respective network connections, media data representative of media content from a media player device of the plurality of media player devices, wherein:

the media data representative of the media content is received by the media player device from a media content provider system that is distinct from the media player device and the MEC system, the media content represented by the media data is to be rendered by the media player device and is encoded in the media data using a first data format, and the accessing of the media data includes:
receiving a request from the media player device to transcode the media data from the first data format to a second data format, and
receiving the media data from the media player device while the media data is being communicated from the media content provider system to the media player device;

transcoding, by the MEC system in a just-in-time transcoding manner as the media player device renders the media content, the media data from the first data format to the second data format; and providing, by the MEC system as the transcoding of the media data is performed, the transcoded media data in the second data format to the media player device by way of the particular network connection.

2. The method of claim 1, wherein:
the method further comprises accessing, by the MEC system, additional data along with the media data representative of the media content;
the first data format is an encoded data format;
the transcoding of the media data includes:
decoding the media data from the encoded data format to a raw data format, and
generating, based on the additional data and the decoded media data in the raw data format, processed media data distinct from the decoded media data; and
the transcoded media data provided to the media player device is based on the processed media data.

3. The method of claim 2, wherein:
the additional data is user preference data representative of a preferred manner of performing an altering of the media content from an original version to an altered version that is to be rendered by the media player device in place of the original version when the media player device renders the media content;
the generating of the processed media data includes altering the media content from the original version to the altered version in accordance with the user preference data; and
the processed media data generated based on the user preference data includes media data representative of the altered version of the media content.

4. The method of claim 2, wherein:
the media content comprises audio content;
the additional data is head pose data representative of a real-time position and orientation of a head of an avatar of a user experiencing an extended reality world by way of the media player device;
the generating of the processed media data includes generating a composite binaural audio stream that is to be rendered by the media player device as the user experiences the extended reality world, the composite binaural audio stream representative of sounds that originate from a plurality of virtual sources within the extended reality world and that are combined, based on the head pose data, to account for virtual acoustic propagation of the sounds to the avatar; and the processed media data generated based on the head pose data includes media data representative of the composite binaural audio stream.

5. The method of claim 1, wherein the media data received from the media player device is an unencrypted version of the media data, the unencrypted version generated by the media player device based on an end-to-end encrypted version of the media data received and decrypted by the media player device.

6. The method of claim 1, further comprising:
identifying, by the MEC system, the media player device with which the particular network connection has been established;
determining, by the MEC system based on the identifying of the media player device, that the first data format in which the accessed media content is encoded is disallowed from being provided to the media player device; and
determining, by the MEC system based on the identifying of the media player device, that the second data format is allowed to be provided to the media player device;
wherein the transcoding of the media data and the providing of the transcoded media data are performed in response to the determinations that the first data format is disallowed and that the second data format is allowed.

7. The method of claim 1, wherein the first data format is a proprietary encoded data format and the second data format is an open encoded data format.

8. The method of claim 1, wherein:
the first data format is a first encoded data format and the second data format is a second encoded data format distinct from the first encoded data format; and
the transcoding of the media data includes decoding the media data from the first encoded data format to a raw data format and re-encoding the media data in the raw data format into the second encoded data format.

9. The method of claim 1, embodied as computer-executable instructions on at least one non-transitory computer-readable medium.

10. A method comprising:
establishing, by a MEC system deployed on a cellular data network, respective network connections with a plurality of media player devices that are connected to the cellular data network and are distinct from one another and from the MEC system;
accessing, by the MEC system by way of a particular network connection of the respective network connections, media data representative of media content from a media player device of the plurality of media player devices, wherein:
the media data representative of the media content is received by the media player device from a media content provider system that is distinct from the media player device and the MEC system,
the media content represented by the media data is to be rendered by the media player device and is encoded in the media data using a proprietary encoded data format, and
the accessing of the media data includes:
receiving a request from the media player device to transcode the media data from the proprietary encoded data format to an open encoded data format, and
receiving the media data from the media player device while the media data is being communicated from the media content provider system to the media player device;

accessing, by the MEC system, user preference data representative of a preferred manner of performing an altering of the media content from an original version to an altered version that is to be rendered by the media player device in place of the original version when the media player device renders the media content;

transcoding, by the MEC system in a just-in-time transcoding manner as the media player device renders the media content, the media data from the proprietary encoded data format to the open encoded data format by:
  decoding the media data from the proprietary encoded data format to a raw data format,
  altering, based on the user preference data and the decoded media data in the raw data format, the media content from the original version to the altered version in accordance with the user preference data, the altered version of the media content represented in processed media data distinct from the decoded media data, and
  re-encoding the processed media data into the open encoded data format; and providing, by the MEC system as the transcoding of the media data is performed, the transcoded media data representing the media content in the open encoded data format to the media player device by way of the particular network connection.

11. The method of claim 10, embodied as computer-executable instructions on at least one non-transitory computer-readable medium.

12. A Multi-access Edge Computing ("MEC") system deployed on a cellular data network and comprising:
  a memory storing instructions; and
  a processor communicatively coupled to the memory and configured to execute the instructions to:
    establish respective network connections with a plurality of media player devices that are connected to the cellular data network and are distinct from one another and from the MEC system;
    access, by way of a particular network connection of the respective network connections, media data representative of media content from a media player device of the plurality of media player devices, wherein:
      the media data representative of the media content is received by the media player device from a media content provider system that is distinct from the media player device and the MEC system,
      the media content represented by the media data is to be rendered by the media player device and is encoded in the media data using a first data format, and
      the accessing of the media data includes:
        receiving a request from the media player device to transcode the media data from the first data format to a second data format, and
        receiving the media data from the media player device while the media data is being communicated from the media content provider system to the media player device;
    transcode, in a just-in-time transcoding manner as the media player device renders the media content, the media data from the first data format to the second data format; and
    provide, as the transcoding of the media data is performed, the transcoded media data in the second data format to the media player device by way of the particular network connection.

13. The MEC system of claim 12, wherein:
the processor is further configured to execute the instructions to access additional data along with the media data representative of the media content;
the first data format is an encoded data format;
the transcoding of the media data includes:
  decoding the media data from the encoded data format to a raw data format, and
  generating, based on the additional data and the decoded media data in the raw data format, processed media data distinct from the decoded media data; and
the transcoded media data provided to the media player device is based on the processed media data.

14. The MEC system of claim 13, wherein:
the additional data is user preference data representative of a preferred manner of performing an altering of the media content from an original version to an altered version that is to be rendered by the media player device in place of the original version when the media player device renders the media content;
the generating of the processed media data includes altering the media content from the original version to the altered version in accordance with the user preference data; and
the processed media data generated based on the user preference data includes media data representative of the altered version of the media content.

15. The MEC system of claim 12, wherein:
the media content comprises audio content; and
the additional data is head pose data representative of a real-time position and orientation of a head of an avatar of a user experiencing an extended reality world by way of the media player device.

16. The MEC system of claim 15, wherein:
the generating of the processed media data includes generating a composite binaural audio stream that is to be rendered by the media player device as the user experiences the extended reality world, the composite binaural audio stream representative of sounds that originate from a plurality of virtual sources within the extended reality world and that are combined, based on the head pose data, to account for virtual acoustic propagation of the sounds to the avatar; and
the processed media data generated based on the head pose data includes media data representative of the composite binaural audio stream.

17. The MEC system of claim 12, wherein the processor is further configured to execute the instructions to:
identify the media player device with which the particular network connection has been established;
determine, based on the identifying of the media player device, that the first data format in which the accessed media content is encoded is disallowed from being provided to the media player device; and
determine, based on the identifying of the media player device, that the second data format is allowed to be provided to the media player device;
wherein the transcoding of the media data and the providing of the transcoded media data are performed in response to the determinations that the first data format is disallowed and that the second data format is allowed.

18. The MEC system of claim 12, wherein the first data format is a proprietary encoded data format and the second data format is an open encoded data format.

19. The MEC system of claim 12, wherein the media data received from the media player device is an unencrypted version of the media data, the unencrypted version generated by the media player device based on an end-to-end encrypted version of the media data received and decrypted by the media player device.

20. The MEC system of claim 12, wherein:
- the first data format is a first encoded data format and the second data format is a second encoded data format distinct from the first encoded data format; and
- the transcoding of the media data includes decoding the media data from the first encoded data format to a raw data format and re-encoding the media data in the raw data format into the second encoded data format.

\* \* \* \* \*